US012753007B2

(12) United States Patent
Kojima et al.

(10) Patent No.: US 12,753,007 B2

(45) Date of Patent: Oct. 6, 2026

(54) CONTROL DEVICE AND WAREHOUSE MANAGEMENT SYSTEM

(71) Applicant: KABUSHIKI KAISHA TOSHIBA, Tokyo (JP)

(72) Inventors: Hidetaka Kojima, Tokyo (JP); Tomoyuki Suwabe, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 810 days.

(21) Appl. No.: 18/182,957

(22) Filed: Mar. 13, 2023

(65) Prior Publication Data

US 2023/0219758 A1 Jul. 13, 2023

Related U.S. Application Data

(63) Continuation of application No. PCT/JP2021/033536, filed on Sep. 13, 2021.

(30) Foreign Application Priority Data

Sep. 23, 2020 (JP) ................................ 2020-158752

(51) Int. Cl.

*G06F 7/00* (2006.01)
*B65G 1/137* (2006.01)
*G05D 1/00* (2006.01)

(52) U.S. Cl.

CPC ......... *B65G 1/1373* (2013.01); *B65G 1/1371* (2013.01); *G05D 1/0212* (2013.01)

(58) Field of Classification Search

CPC .. B65G 1/1373; B65G 1/1371; B65G 1/1378; B65G 1/10; B65G 1/00; B65G 1/02;

(Continued)

(56) References Cited

U.S. PATENT DOCUMENTS

| | | | |
|---|---|---|---|
| 11,014,745 | B2 | 5/2021 | Kazama et al. |
| 2007/0288123 | A1 | 12/2007 | D'Andrea et al. |

(Continued)

FOREIGN PATENT DOCUMENTS

| | | | |
|---|---|---|---|
| CN | 105517922 | A | 4/2016 |
| CN | 106779531 | A | 5/2017 |

(Continued)

OTHER PUBLICATIONS

European Patent Office, Extended European Search Report in EP App. No. 21872237.9, 8 pages (Sep. 30, 2024).

(Continued)

*Primary Examiner* — Yolanda R Cumbess

(74) *Attorney, Agent, or Firm* — Finnegan, Henderson, Farabow, Garrett & Dunner, LLP

(57) ABSTRACT

A control device according to an embodiment includes a communication unit and a processor. The communication unit is configured to communicate with a transport vehicle and a host server, the transport vehicle being configured to move a movable shelf storing an article. The processor is configured to acquire from the host server, by the communication unit, a removal instruction indicating an article to be removed; specify, based on the removal instruction, the movable shelf having a plurality of shelves for storing the article and a shelf height at which the article is stored on the movable shelf; and switch between moving, by the transport vehicle, the specified movable shelf to a first position and a second position suitable for removing an article from a second shelf higher than the first shelf, based on the specified height.

6 Claims, 8 Drawing Sheets

(58) Field of Classification Search

CPC .... B65G 1/137; B65G 1/1375; B65G 1/0407; B65G 1/0428; B65G 1/0435; B65G 1/06; B65G 2209/00; G05D 1/0212; G05D 1/0297; G06Q 10/08; G06Q 10/087; G06Q 10/0874; G06Q 10/08741; G06Q 10/08743; G06K 2017/0048; G06K 2017/0051; G06K 2017/0074

USPC .................................................. 700/213–216

See application file for complete search history.

(56) References Cited

U.S. PATENT DOCUMENTS

| | | | | |
|---|---|---|---|---|
| 2016/0229631 | A1* | 8/2016 | Kimura | B65G 1/1378 |
| 2017/0166399 | A1* | 6/2017 | Stubbs | G06Q 10/087 |

FOREIGN PATENT DOCUMENTS

| | | | |
|---|---|---|---|
| CN | 108750511 | A | 11/2018 |
| JP | 2009-539727 | A | 11/2009 |
| JP | 2016-55963 | A | 4/2016 |
| JP | 2019- 502616 | A | 1/2019 |
| JP | 2019-137543 | A | 8/2019 |
| JP | 6736789 | B1 | 8/2020 |
| WO | WO 2014/170433 | A1 | 10/2014 |
| WO | WO 2015/097736 | A1 | 7/2015 |
| WO | WO 2017/175301 | A1 | 10/2017 |

OTHER PUBLICATIONS

Japan Patent Office, International Search Report PCT/JP2021/033536 ,2 pages, (Nov. 22, 2021).

State Intellectual Property Office of People's Republic of China, Office Action in CN App. No. 202180065071.8 (Jun. 29, 2025).

* cited by examiner

| Article identification information | Movable shelf identification information | Movable shelf position information | Shelf identification information | Shelf height information [mm] |
|---|---|---|---|---|
| 19864135 | 100001 | 12-34 | 0101 | 200 |
| 19852495 | 100001 | 12-34 | 0201 | 400 |
| 18114961 | 100001 | 12-34 | 1503 | 3000 |
| 48952784 | 100002 | 12-35 | 0102 | 200 |
| 48985631 | 100002 | 12-35 | 0103 | 200 |
| 74425461 | 100003 | 12-35 | 0501 | 1000 |
| | | 13-34 | 0203 | 400 |

FIG. 3

CONTROL DEVICE AND WAREHOUSE MANAGEMENT SYSTEM

CROSS REFERENCE TO RELATED APPLICATIONS

This application is a Continuation Application of PCT Application No. PCT/JP2021/033536, filed Sep. 13, 2021 and based upon and claiming the benefit of priority from Japanese Patent Application No. 2020-158752, filed Sep. 23, 2020, the entire contents of all of which are incorporated herein by reference.

FIELD

Embodiments described herein relate generally to a control device and a warehouse management system.

BACKGROUND

A warehouse management system (cargo handling system) that removes a designated article from a shelf (movable shelf, POD) has been put into practical use. The automated warehouse system is constituted by, for example, a control device, an automated guided vehicle (AGV), and the like. The control device controls an operation of the automated guided vehicle. The automated guided vehicle is configured to travel on a flat surface. Under the control of the control device, the automated guided vehicle goes under a movable shelf, lifts the movable shelf, and moves the movable shelf to a place (picking station) where an article is picked up from the movable shelf.

Since the automated guided vehicle is configured to travel on a flat surface, there is a problem that, in a case where a space is left above the movable shelf in the warehouse, the storage efficiency of articles per floor area is degraded.

BRIEF DESCRIPTION OF THE DRAWINGS

FIG. 3 is an explanatory diagram for explaining an example of a database of the warehouse management system according to the first embodiment.

DETAILED DESCRIPTION

A control device according to an embodiment includes a communication unit and a processor. The communication unit is configured to communicate with a transport vehicle and a host server, the transport vehicle being configured to move a movable shelf storing an article. The processor is configured to acquire from the host server, by the communication unit, a removal instruction indicating an article to be removed; specify, based on the removal instruction, the movable shelf having a plurality of shelves for storing the article and a shelf height at which the article is stored on the movable shelf; and switch between moving, by the transport vehicle, the specified movable shelf to a first position and a second position suitable for removing an article from a second shelf higher than the first shelf, based on the specified height.

Hereinafter, embodiments will be described with reference to the drawings.

First Embodiment

Figure 1:
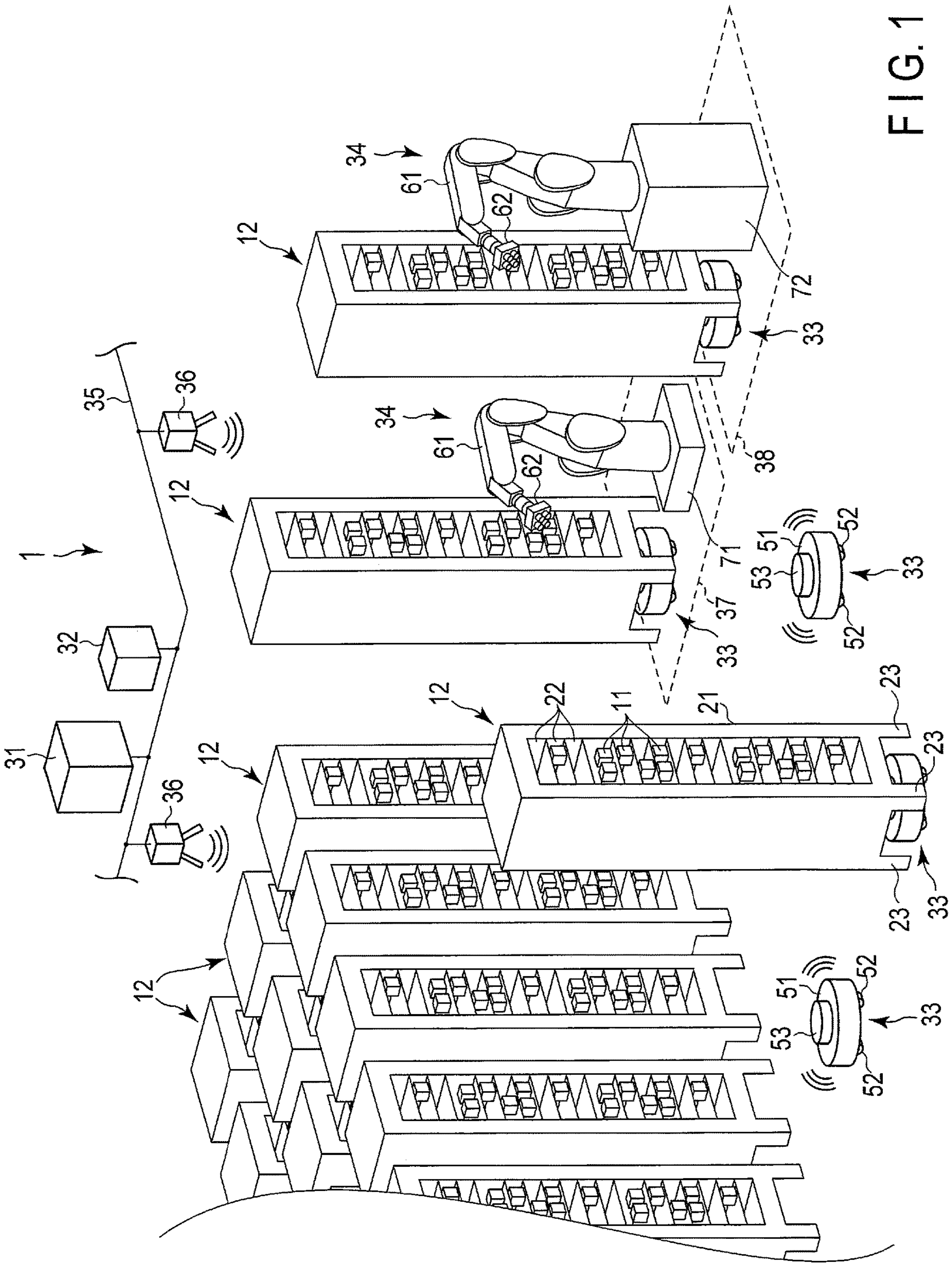
FIG. 1 is an explanatory diagram for explaining a schematic configuration example of a warehouse management system according to a first embodiment.
Figure 2:
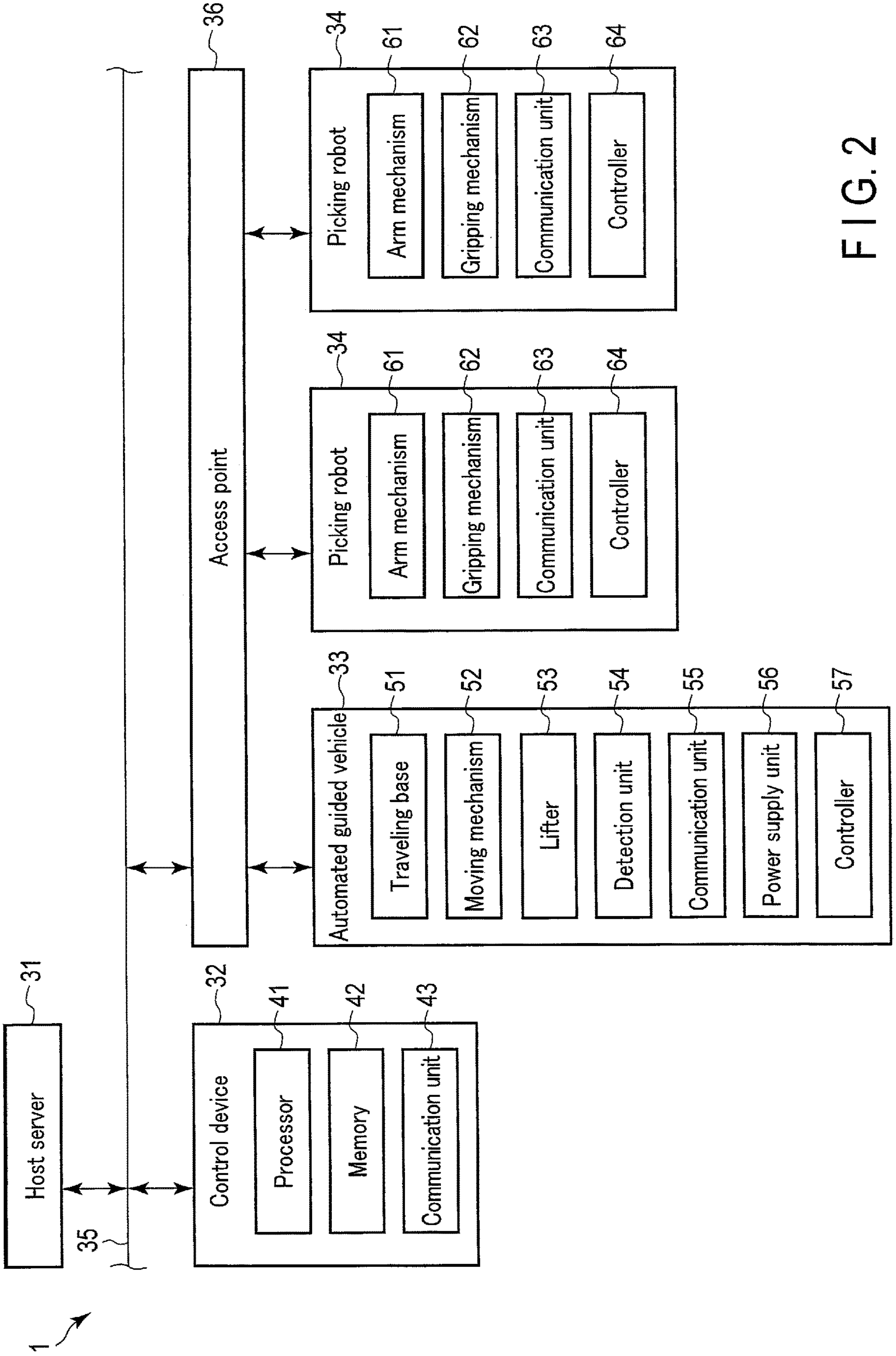
FIG. 2 is an explanatory diagram for explaining a configuration example of the warehouse management system according to the first embodiment.

FIG. 1 is an explanatory diagram for explaining a schematic configuration example of a warehouse management system 1 according to the first embodiment. FIG. 2 is a block diagram for explaining each structure of the warehouse management system 1 according to the first embodiment.

A warehouse management system 1 according to an embodiment is a cargo handling system in a warehouse or the like for moving a movable shelf 12 on which various articles 11 are stored to a predetermined place (picking station) and for removing an article 11 from the movable shelf 12.

First, articles 11 and movable shelves 12 stored in a warehouse are described.

Articles 11 are various articles such as merchandise, parts, and mail. Identification information (article identification information) is set in advance for each article 11. The article identification information is identification information unique to each article. In other words, the article identification information is used to identify an article 11.

The movable shelf 12 is a storage container that stores articles 11. The movable shelf 12 includes a movable shelf base 21, a plurality of shelves (cells) 22, and legs 23.

The movable shelf base 21 is a support that supports the plurality of shelves 22. The movable shelf base 21 is formed to be long in a vertical direction. The movable shelf base 21 is configured to have a height on the order of 3.0 [m] to 4.5 [m] including the legs 23, for example. The movable shelf base 21 is configured as, for example, a frame to which the plurality of shelves 22 are fastened. The height of the movable shelf base 21 may be changed as appropriate according to the dimensions of the warehouse in which the warehouse management system 1 is operated.

Each of the plurality of shelves 22 is a housing unit configured to be capable of housing articles 11. The plurality of shelves 22 are arranged in a vertical direction, for example. Each shelf 22 is fastened to the movable shelf base 21 at a discretionarily selected height within an upper limit of the height of the movable shelf base 21. That is, the movable shelf 12 includes a plurality of shelves 22 arranged at different heights at least in a vertical direction. A plurality of shelves 22 may be arranged in a horizontal direction. Thus, in a warehouse or the like, a space in a vertical direction can be used for storing articles 11.

The leg 23 is a supporting part that supports the movable shelf base 21. The leg 23 is configured to form a space between the movable shelf 12 and the placement surface when the movable shelf 12 is placed on the floor surface. For example, the legs 23 are configured as four columns that support the movable shelf base 21 at a position higher than the placement surface.

Identification information (movable shelf identification information) is set in advance for the movable shelf 12. The movable shelf identification information is identification information unique to the movable shelf 12. In other words, the movable shelf identification information is used to identify the movable shelf 12.

Information indicating a position (movable shelf position information) is set in advance for the movable shelf 12. The movable shelf position information is information indicating a position where the movable shelf 12 is placed. The movable shelf 12 is moved by an automated guided vehicle (AGV) from the position indicated by the movable shelf position information to the picking station. The movable shelf 12 is moved by the automated guided vehicle from the picking station to the position indicated by the movable shelf position information.

Identification information (shelf identification information) is set in advance for each shelf 22 of the movable shelf 12. The shelf identification information is identification information unique to the shelf 22. That is, the shelf identification information is used to identify the shelf 22.

Information indicating a height (shelf height information) is set in advance for each shelf 22 of the movable shelf 12. The shelf height information is information indicating a height at which the shelf 22 is provided (a distance from the floor surface in a vertical direction).

Next, each of the structures constituting the warehouse management system 1 is described.

The warehouse management system 1 includes a host server 31, a control device 32, an automated guided vehicle 33, a picking robot 34, and the like. The warehouse management system 1 may include a plurality of automated guided vehicles 33 and a plurality of picking robots 34. The host server 31, the control device 32, the automated guided vehicle 33, and the picking robot 34 of the warehouse management system 1 are connected to a network 35. For example, the host server 31 and the control device 32 are connected to the network 35 by wired communication. The automated guided vehicle 33 and the picking robot 34 are connected to the network 35 by wireless communication via an access point 36 of a wireless LAN.

Further, in the warehouse management system 1, a first picking station 37 and a second picking station 38 at which the picking robots 34 are respectively stationed are provided.

The host server 31 is a device that instructs the control device 32 which article is to be removed. The host server 31 is a general server device including a communication interface, a processor, a memory, a storage device, and the like. For example, the host server 31 transmits, to the control device 32, a removal instruction including a list of article identification information of articles to be removed.

Next, a structure of the control device 32 is described.

The control device 32 controls the operations of the automated guided vehicle 33 and the picking robot 34. That is, the control device 32 moves the movable shelf 12 to the first picking station 37 or the second picking station 38, and causes the automated guided vehicle 33 and the picking robot 34 to perform a cargo handling process of removing an article 11 from the movable shelf 12 by the picking robot 34.

The control device 32 includes a processor 41, a memory 42, and a communication unit 43.

The processor 41 is an arithmetic element that executes arithmetic processing. The processor 41 is configured as, for example, a central processing unit (CPU). The processor 41 performs various processing based on a program stored in the memory 42. The processor 41 may be configured as, for example, a programmable logic controller (PLC), a micro processor unit (MPU), or a micro controller unit (MCU).

The processor 41 generates a control signal for causing the automated guided vehicle 33, the picking robot 34, and the like to operate. The processor 41 transmits a control signal to the automated guided vehicle 33 and the picking robot 34 via the communication unit 43, the network 35, and the like. The processor 41 acquires information indicating an operation result from the automated guided vehicle 33 and the picking robot 34 via the communication unit 43, the network 35, and the like. The processor 41 can thus sequentially recognize the states of the automated guided vehicle 33 and the picking robot 34.

The memory 42 is a storage device that stores programs and data. The memory 42 has a ROM which is a read-only nonvolatile memory, a RAM that temporarily stores data, or a data-storing storage, or a combination thereof.

The communication unit 43 is a structure for communicating with other devices. The communication unit 43 communicates with the host server 31 via the network 35. The communication unit 43 communicates with the automated guided vehicle 33 and the picking robot 34 via the network 35 and the access point 36.

Next, the configuration of the automated guided vehicle 33 is described.

The automated guided vehicle 33 is a self-propelled carriage (transport vehicle) that travels under the control of the control device 32. The automated guided vehicle 33 includes a traveling base 51, a moving mechanism 52, a lifter 53, a detection unit 54, a communication unit 55, a power supply unit 56, and a controller 57.

The traveling base 51 is a main body of the automated guided vehicle 33 moved by the moving mechanism 52. The traveling base 51 is provided with the moving mechanism 52, the lifter 53, the detection unit 54, the communication unit 55, the power supply unit 56, the controller 57, and the like. The traveling base 51 is configured to have dimensions capable of entering a space between the movable shelf 12 and the floor surface (placement surface).

The moving mechanism 52 is configured to move the traveling base 51 under the control of the controller 57. The moving mechanism 52 includes, for example, a plurality of wheels driven by a motor (not shown) or the like. The wheel is, for example, a mecanum wheel, an omni wheel, or the like. According to such a configuration, the moving mechanism 52 can move forward, backward, translationally, diagonally, and the like. Further, the moving mechanism 52 may be configured to turn the traveling base 51. Further, the moving mechanism 52 may use a rubber roller, a rubber crawler, or the like, instead of the wheels.

The lifter 53 is a mechanism that lifts an object based on the control of the controller 57. The lifter 53 includes a contact surface that comes into contact with an object, a lift mechanism, and a drive unit that drives the lift mechanism. The drive unit applies a driving force to the lift mechanism. The lift mechanism moves the contact surface in a direction (for example, a vertical direction) in which the contact surface protrudes from the traveling base 51 by a driving force transmitted from the driving unit. That is, the contact surface of the lifter 53 is raised or lowered by the operation of the lift mechanism and the drive unit. The lifter 53 can lift an object by further raising the contact surface in a state in which the contact surface is in contact with the object. The lifter 53 can also lower an object by lowering the contact surface. The lifter 53 may include a sensor that detects a pressure applied to the contact surface of the lifter 53. It is thus possible to detect that the contact surface is in contact with an object.

The detection unit 54 is configured to detect a traveling posture, a moving distance, and the like of the automated guided vehicle 33. The detection unit 54 provides a detection result to the controller 57.

The communication unit 55 is a structure for communicating with other devices. The communication unit 55 communicates with the control device 32 via the network 35 and the access point 36.

The power supply unit 56 is configured to supply electric power to each unit of the automated guided vehicle 33. The power supply unit 56 includes a secondary battery, a charging circuit, and the like. The secondary battery is configured as, for example, a lithium ion secondary battery including an electrode group in which a positive electrode and a negative electrode are stacked with a separator interposed therebetween. The charging circuit includes a power input terminal. The charging circuit charges the secondary battery with a DC voltage supplied from the power input terminal connected to a connector of a charging stand (not shown). The power supply unit 56 may further include a converter that converts AC power into DC power. The power supply unit 56 may further include a power receiving circuit that receives electric power in a non-contact manner and supplies a DC voltage to the charging circuit.

The controller 57 controls the operation of the automated guided vehicle 33. The controller 57 includes a processor and a memory. The controller 57 controls various operations by the processor executing a program stored in the memory. The controller 57 may include, for example, a PLC, an MPU, an MCU, or the like.

The controller 57 controls the moving of the automated guided vehicle 33 by the moving mechanism 52 based on the control signal from the control device 32 and the detection result from the detection unit 54. The controller 57 also controls lifting of an object by the lifter 53 based on the control signal from the control device 32. The controller 57 also controls the charging operation of the power supply unit 56. In addition, the controller 57 transmits a result of the operation based on the control signal from the control device 32 to the control device 32. Thus, the state of the automated guided vehicle 33 can be sequentially transmitted to the control device 32.

With the above-described configuration, the automated guided vehicle 33 can get under an object by the moving mechanism 52 and lift the object by the lifter 53. Furthermore, the automated guided vehicle 33 can be moved by the moving mechanism 52 while the automated guided vehicle 33 is lifting the object. Thus, the automated guided vehicle 33 can perform a loading process of lifting and moving an object.

For example, the automated guided vehicle 33 gets into a space between the placement surface of the movable shelf 12 and the movable shelf base 21, lifts the movable shelf 12 by the lifter 53, and is moved by the moving mechanism 52. Thus, the automated guided vehicle 33 can move the movable shelf 12 to an arbitrary position.

Next, a configuration of the picking robot 34 is described.

The picking robot 34 is a cargo handling device that removes an article 11 from the movable shelf 12 based on the control of the control device 32. The picking robot 34 includes an arm mechanism 61, a gripping mechanism 62, a communication unit 63, and a controller 64.

The arm mechanism 61 is a mechanism that moves the gripping mechanism 62. The arm mechanism 61 includes a plurality of arms and a joint mechanism that connects the plurality of arms. The arm mechanism 61 is configured as, for example, a six-axis articulated robot. The joint mechanism is movable by an actuator (not shown) controlled by the controller 64 to drive the arm.

The gripping mechanism 62 is a mechanism that grips an article 11. The gripping mechanism 62 is configured to grip an article 11 by, for example, a suction pad. The suction pad is in contact with the surface of an article 11, and when a negative pressure is applied to the inside of the pad, the suction pad is sucked to the surface of the article 11 and can grip the article 11. Further, the gripping mechanism 62 may be configured as, for example, a gripper that grips an article 11 with two or more contact points. Further, the gripping mechanism 62 may have a configuration in which a suction pad and a gripper are used in combination.

The communication unit 63 is a structure for communicating with other devices. The communication unit 63 communicates with the control device 32 via the network 35 and the access point 36.

The controller 64 controls the operation of the picking robot 34. The controller 64 includes a processor and a memory. The controller 64 controls various operations by the processor executing a program stored in the memory. The controller 64 may include, for example, a PLC, an MPU, an MCU, or the like.

Based on a control signal from the control device 32, the controller 64 causes the arm mechanism 61 to move the gripping mechanism 62, causes the gripping mechanism 62 to grip the article 11, and unloads the article 11 to a predetermined sorting destination (for example, a bin, a car, or the like). In addition, the controller 64 transmits a result of the operation based on the control signal from the control device 32 to the control device 32. Thus, the state of the picking robot 34 can be sequentially transmitted to the control device 32.

Each of the first picking station 37 and the second picking station 38 is a place for removing an article 11 from the movable shelf 12.

A picking robot 34 is stationed in each of the first picking station 37 and the second picking station 38. At the first picking station 37, the picking robot 34 is situated on a base 71 having a first height. At the second picking station 38, the picking robot 34 is situated on a base 72 having a second height greater than the first height.

The first picking station 37 is a place suitable for removing an article 11 from a lower shelf 22 of the movable shelf 12. That is, a range of heights that allows an article 11 to be removed is set in advance at the first picking station 37. For example, the first picking station 37 is suitable for removing an article 11 from a shelf 22 at a height smaller than a preset threshold above the floor.

The second picking station 38 is a place suitable for removing of an article 11 from a higher shelf 22 of the movable shelf 12. That is, a range of heights that allows an article 11 to be removed is set in advance at the second picking station 38. For example, the second picking station 38 is suitable for removing an article 11 from a shelf 22 at a height equal to or greater than a preset threshold.

The threshold is a value set in accordance with the height of the shelf 22 at which an article 11 can be removed in each of the first picking station 37 and the second picking station 38. That is, the threshold value is a value set according to the height of the shelf 22 at which an article 11 can be removed by the picking robot 34 situated on the base 71 of the first height and the height of the shelf 22 at which an article 11 can be removed by the picking robot 34 situated on the base 72 of the second height.

The upper limit of the height of the shelf 22 at which handling can be performed at the second picking station 38 is set in accordance with the height of the shelf 22 at which the article 11 can be removed by the picking robot 34 situated on the base 72 of the second height.

Next, a database that the control device 32 has in advance will be described.

FIG. 3 is an explanatory diagram for explaining an example of the database.

As illustrated in FIG. 3, in the database, "article identification information", "movable shelf identification information", "movable shelf position information", "shelf identification information", and "shelf height information [mm]" are associated with each other. That is, the processor 41 of the control device 32 can acquire the "movable shelf identification information", "movable shelf position information", "shelf identification information", and "shelf height information [mm]" associated with the "article identification information" by referring to the database. Accordingly, when the processor 41 acquires the removal instruction from the host server 31, the processor 41 can acquire information for specifying the movable shelf 12 on which the article 11 indicated by the removal instruction is stored, the position of the movable shelf 12, the shelf 22, and the height of the shelf 22.

The database is stored in advance in, for example, the memory 42 of the control device 32. Note that the database may be stored in another device connected via the network 35.

Further, the removal instruction transmitted from the host server 31 may include information such as "article identification information", "movable shelf identification information", "movable shelf position information", "shelf identification information", and "shelf height information [mm] ". In this case, the database may be omitted.

Next, the operation of the control device 32 is described.

Figure 4:
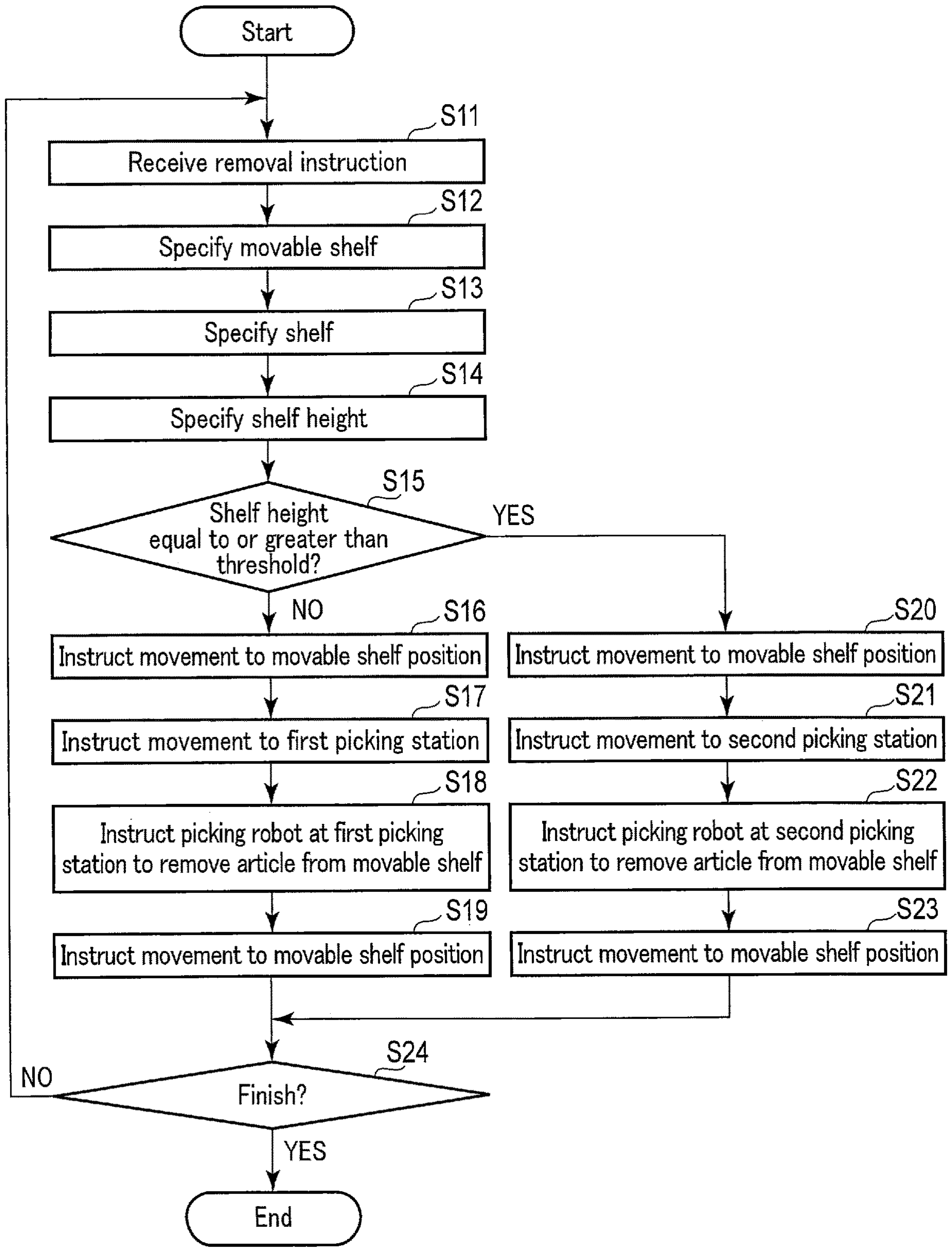
FIG. 4 is an explanatory diagram for explaining an example of an operation of a control device according to the first embodiment.

FIG. 4 is an explanatory diagram for explaining the operation of the control device 32.

The processor 41 of the control device 32 acquires a removal instruction indicating a list of articles 11 to be removed from the host server 31 through the communication unit 43 (step S11). The removal instruction may be transmitted from the host server 31 to the control device 32 at an arbitrary timing or periodically. The removal instruction may be stored in a recording medium or the like that can be connected to the control device 32, and may be given to the control device 32.

The processor 41 specifies the movable shelf 12 on which the article 11 is stored based on the acquired removal instruction (step S12). In other words, the processor 41 acquires the article identification information from the removal instruction, and acquires from the database the movable shelf identification information associated with the acquired article identification information. The processor 41 acquires, from the database, the movable shelf position information associated with the acquired movable shelf identification information.

The processor 41 specifies the shelf 22 on which the article 11 is stored on the specified movable shelf 12 (step S13). That is, the processor 41 acquires, from the database, the shelf identification information associated with the article identification information acquired from the removal instruction.

The processor 41 specifies the height (shelf height) of the specified shelf 22 (step S14). That is, the processor 41 acquires the shelf height information associated with the acquired shelf identification information from the database.

The processor 41 determines whether or not the specified shelf height is equal to or greater than a preset threshold (step S15). As described above, the threshold value is a value set according to the height of the shelf 22 at which the article 11 can be removed in each of the first picking station 37 and the second picking station 38.

When the processor 41 determines that the specified shelf height is less than the preset threshold (No in step S15), the processor 41 transmits, to the automated guided vehicle 33, a control signal for instructing movement to the position indicated by the movable shelf position information acquired in step S12 (step S16). By moving in accordance with the control signal, the automated guided vehicle 33 gets into the position indicated by the movable shelf position information, that is, between the movable shelf base 21 of the movable shelf 12 to be handled and the floor surface.

Further, when the moving of the automated guided vehicle 33 is completed, the processor 41 transmits a control signal for instructing the automated guided vehicle 33 to raise the lifter 53. The automated guided vehicle 33 raises the lifter 53 in response to the control signal. As a result, the automated guided vehicle 33 lifts the movable shelf 12 by the lifter 53.

The processor 41 transmits a control signal for instructing movement to the first picking station 37 to the automated guided vehicle 33 (step S17). The automated guided vehicle 33 moves to the first picking station 37 in response to the control signal while lifting the movable shelf 12 by the lifter 53. In other words, the automated guided vehicle 33 moves the movable shelf 12 to the first picking station 37.

The processor 41 transmits a control signal for instructing the picking robot 34 of the first picking station 37 to remove the article 11 from the movable shelf 12 (step S18). The processor 41 transmits, to the picking robot 34, at least information indicating the position of the shelf 22 on which the article 11 to be picked up is stored. The picking robot 34 generates an operation plan for moving the gripping mechanism 62 by the arm mechanism 61 based on the received control signal. The picking robot 34 causes the gripping mechanism 62 to grip the article 11 based on the operation plan, and unloads the article 11 to a predetermined sorting destination.

When unloading by the picking robot 34 is completed, the processor 41 transmits, to the automated guided vehicle 33, a control signal for instructing movement to a position indicated by the movable shelf position information acquired in step S12 (step S19), and proceeds to processing of step S24, which is described later. That is, the processor 41 transmits a control signal to the automated guided vehicle 33 so as to move the movable shelf 12 to the original position. The automated guided vehicle 33 moves in response to the control signal to move the movable shelf 12 from which the article 11 has been removed to the original position, namely the position indicated by the movable shelf position information.

Further, when the moving of the automated guided vehicle 33 is completed, the processor 41 transmits a control signal for instructing the automated guided vehicle 33 to lower the lifter 53. The automated guided vehicle 33 lowers the lifter 53 in response to the control signal. The automated guided vehicle 33 thus lowers the movable shelf 12, which has been lifted by the lifter 53, to the floor surface.

When the processor 41 determines in step S15 that the identified shelf height is equal to or greater than the preset threshold (Yes in step S15), the processor 41 transmits, to the automated guided vehicle 33, a control signal for instructing movement to the position indicated by the movable shelf position information acquired in step S12 (step S20). By moving in accordance with the control signal, the automated guided vehicle 33 gets into the position indicated by the movable shelf position information, that is, between the movable shelf base 21 of the movable shelf 12 to be handled and the floor surface.

Further, when the moving of the automated guided vehicle 33 is completed, the processor 41 transmits a control signal for instructing the automated guided vehicle 33 to raise the lifter 53. The automated guided vehicle 33 raises the lifter 53 in response to the control signal. As a result, the automated guided vehicle 33 lifts the movable shelf 12 by the lifter 53.

The processor 41 transmits a control signal for instructing movement to the second picking station 38 to the automated guided vehicle 33 (step S21). The automated guided vehicle 33 moves to the second picking station 38 in response to the control signal while lifting the movable shelf 12 by the lifter 53. That is, the automated guided vehicle 33 moves the movable shelf 12 to the second picking station 38.

The processor 41 transmits a control signal for instructing the picking robot 34 of the second picking station 38 to remove the article 11 from the movable shelf 12 (step S22). The picking robot 34 generates an operation plan for moving the gripping mechanism 62 by the arm mechanism 61 based on the received control signal. The picking robot 34 causes the gripping mechanism 62 to grip the article 11 based on the operation plan, and unloads the article 11 to a predetermined sorting destination.

When unloading by the picking robot 34 is completed, the processor 41 transmits, to the automated guided vehicle 33, a control signal for instructing movement to a position indicated by the movable shelf position information acquired in step S12 (step S23), and proceeds to processing of step S24, which is described later. That is, the processor 41 transmits a control signal to the automated guided vehicle 33 so as to move the movable shelf 12 to the original position. The automated guided vehicle 33 moves in response to the control signal to move the movable shelf 12 from which the article 11 has been removed to the original position, namely the position indicated by the movable shelf position information.

Further, when the moving of the automated guided vehicle 33 is completed, the processor 41 transmits a control signal for instructing the automated guided vehicle 33 to lower the lifter 53. The automated guided vehicle 33 lowers the lifter 53 in response to the control signal. The automated guided vehicle 33 thus lowers the movable shelf 12, which has been lifted by the lifter 53, to the floor surface.

The processor 41 determines whether or not to end the processing (step S24). For example, the processor 41 determines whether or not there is an unhandled article 11. In other words, the processor 41 determines whether or not the cargo handling processing of all the articles 11 indicated by the removal instruction has been completed.

When the processor 41 determines not to end the processing (No in step S24), the processor 41 proceeds to the processing of step S11, and outputs a control signal to the automated guided vehicle 33 and the picking robot 34 so as to perform the load handling processing of the next article 11.

When the processor 41 determines to end the process (Yes in step S24), the processor 41 ends the process of FIG. 4.

As described above, the control device 32 in the warehouse management system 1 includes the automated guided vehicle 33 that moves the movable shelf 12 that stores the article 11, the host server 31, the communication unit 43 that performs communication, and the processor 41. The processor 41 acquires a removal instruction indicating an article 11 to be removed from the host server 31, and specifies the movable shelf 12 and the height of the shelf 22 (storage position) storing the article 11 on the movable shelf 12 based on the removal instruction. Based on the identified height, the processor 41 switches between moving the identified movable shelf 12 to a first position (first picking station 37) by the automated guided vehicle 33 and moving the identified movable shelf 12 to a second position (second picking station) suitable for removing the article from the shelf 22 higher than the first position.

The control device 32 can thus move the movable shelf 12 to the picking stations designed for handling at different heights in accordance with the height at which the articles 11 are stored on the movable shelf 12. Thus, the control device 32 can smoothly remove the article 11 from a high movable shelf 12. Thus, the high movable shelf 12 can be easily operated in the warehouse, and the space in the vertical direction in the warehouse can be effectively used. As a result, the warehouse management system 1 can efficiently store the articles 11 in the warehouse with a simple configuration.

Second Embodiment

Figure 5:
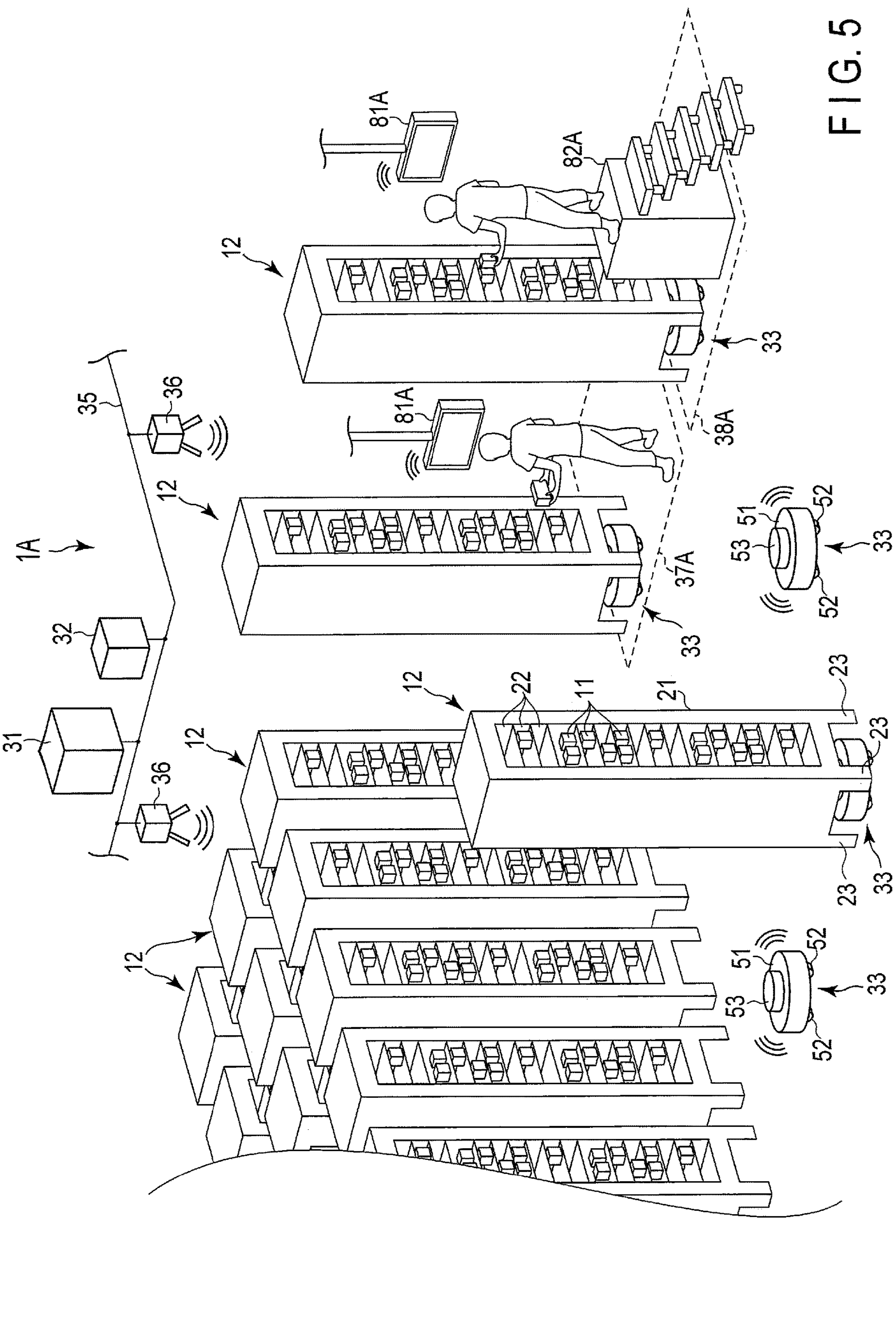
FIG. 5 is an explanatory diagram for explaining a schematic configuration example of a warehouse management system according to a second embodiment.

FIG. 5 is an explanatory diagram for explaining a schematic configuration example of the warehouse management system 1A according to the second embodiment. The same components as those in the first embodiment are denoted by the same reference numerals, and a detailed description thereof is omitted.

The warehouse management system 1A includes a host server 31, a control device 32, an automated guided vehicle 33, a display device 81A, and the like. The warehouse management system 1A may include a plurality of automated guided vehicles 33 and a plurality of display devices 81A. The host server 31, the control device 32, the automated guided vehicle 33, and the display device 81A of the warehouse management system 1A are connected to a network 35. For example, the host server 31, the control device 32, and the display device 81A are connected to the network 35 by wired communication. The automated guided vehicle 33 is connected to the network 35 by wireless communication via an access point 36 of a wireless LAN.

Further, in the warehouse management system 1A, a first picking station 37A and a second picking station 38A in which the display devices 81A are respectively disposed are provided.

The display device 81A is an apparatus that displays a screen in accordance with information input from the control device 32. The display device 81A includes, for example, a display that displays a video signal input from the control device 32. In addition, the display device 81A may be configured to include a graphic controller that generates a display screen based on information input from the control device 32 and a display that displays an image.

Each of the first picking station 37A and the second picking station 38A is a place for removing an article 11 from the movable shelf 12.

In each of the first picking station 37A and the second picking station 38A, a staff member in charge of removing an article 11 from the movable shelf 12 is stationed. At the first picking station 37A, a staff member is stationed on the floor surface. At the second picking station 38A, a staff member is stationed on a work table 82A higher than the floor surface.

The first picking station 37A is a place suitable for removing an article 11 from a lower shelf 22 of the movable shelf 12. That is, at the first picking station 37A, a range of heights in which an article 11 can be removed is set in advance. For example, the first picking station 37A is suitable for removing an article 11 from a shelf 22 at a height smaller than a preset threshold above the floor.

The second picking station 38A is a place suitable for removing the article 11 from a higher shelf 22 of the movable shelf 12. That is, at the second picking station 38A, a range of heights in which the article 11 can be removed is set in advance. For example, the second picking station 38A is suitable for removing an article 11 from a shelf 22 at a height equal to or greater than a preset threshold.

The thresholds are values set in accordance with the heights of the shelves 22 at which the staff member at the first picking station 37A can remove an article 11 and those at which the staff member at the second picking station 38A can remove an article 11.

Further, the upper limit of the height of the shelf 22 that can be handled at the second picking station 38A is set in accordance with the height of the shelf 22 from which an article 11 can be removed by the staff member standing on the work table 82A.

Figure 6:
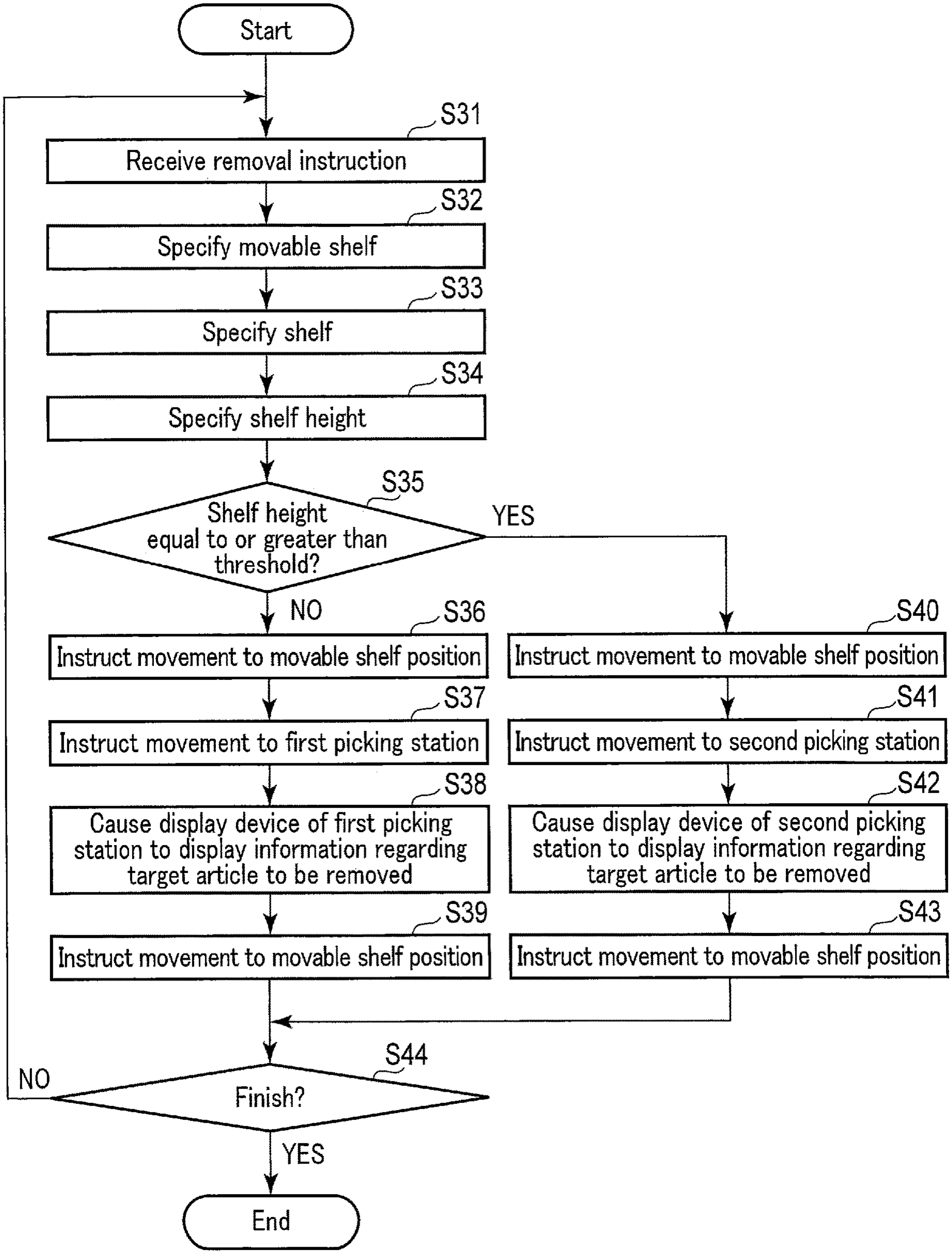
FIG. 6 is an explanatory diagram for explaining an example of an operation of a control device according to the second embodiment.

FIG. 6 is an explanatory diagram for explaining the operation of the control device 32 in the warehouse management system 1A according to the second embodiment.

The processor 41 of the control device 32 acquires a removal instruction indicating a list of articles 11 to be removed from the host server 31 through the communication unit 43 (step S31). The removal instruction may be transmitted from the host server 31 to the control device 32 at an arbitrary timing or periodically. The removal instruction may be stored in a recording medium or the like that can be connected to the control device 32, and may be given to the control device 32.

The processor 41 specifies the movable shelf 12 on which the article 11 is stored based on the acquired removal instruction (step S32). In other words, the processor 41 acquires the article identification information from the removal instruction, and acquires from the database the movable shelf identification information associated with the acquired article identification information. The processor 41 acquires, from the database, the movable shelf position information associated with the acquired movable shelf identification information.

The processor 41 specifies the shelf 22 on which the article 11 is stored on the specified movable shelf 12 (step S33). That is, the processor 41 acquires, from the database, the shelf identification information associated with the article identification information acquired from the removal instruction.

The processor 41 specifies the height (shelf height) of the specified shelf 22 (step S34). That is, the processor 41 acquires the shelf height information associated with the acquired shelf identification information from the database.

The processor 41 determines whether or not the specified shelf height is equal to or greater than a preset threshold (step S35). As described above, the thresholds are values set according to the heights of the shelves 22 from which the articles 11 can be removed at the first picking station 37A and the second picking station 38A, respectively.

When the processor 41 determines that the specified shelf height is less than the preset threshold (No in step S35), the processor 41 transmits, to the automated guided vehicle 33, a control signal for instructing movement to the position indicated by the movable shelf position information acquired in step S32 (step S36). By moving in accordance with the control signal, the automated guided vehicle 33 gets into the position indicated by the movable shelf position information, that is, between the movable shelf base 21 of the movable shelf 12 to be handled and the floor surface.

Further, when the moving of the automated guided vehicle 33 is completed, the processor 41 transmits a control signal for instructing the automated guided vehicle 33 to raise the lifter 53. The automated guided vehicle 33 raises the lifter 53 in response to the control signal. As a result, the automated guided vehicle 33 lifts the movable shelf 12 by the lifter 53.

The processor 41 transmits a control signal for instructing movement to the first picking station 37A to the automated guided vehicle 33 (step S37). The automated guided vehicle 33 moves to the first picking station 37A in response to the control signal while lifting the movable shelf 12 by the lifter 53. In other words, the automated guided vehicle 33 moves the movable shelf 12 to the first picking station 37A.

The processor 41 transmits information on the article 11 to be picked up from the movable shelf 12 to the display device 81A of the first picking station 37A and causes the display device 81A to display the information (step S38). The processor 41 causes the display device 81A to display at least information indicating the position of the shelf 22 on which the article 11 to be removed is stored. The processor 41 may cause the display device 81A to display an image of the appearance of the article 11 to be removed. The staff member in charge at the first picking station 37A unloads the article 11 removed from the movable shelf 12 to a predetermined sorting destination.

When the unloading is completed, the processor 41 transmits, to the automated guided vehicle 33, a control signal for instructing movement to the position indicated by the movable shelf position information acquired in step S32 (step S39), and proceeds to the process of step S44 described below. That is, the processor 41 transmits a control signal to the automated guided vehicle 33 so as to move the movable shelf 12 to the original position. The automated guided vehicle 33 moves in response to the control signal to move the movable shelf 12 from which the article 11 has been removed to the original position, that is, the position indicated by the movable shelf position information.

Further, when the moving of the automated guided vehicle 33 is completed, the processor 41 transmits a control signal for instructing the automated guided vehicle 33 to lower the lifter 53. The automated guided vehicle 33 lowers the lifter 53 in response to the control signal. Thus, the automated guided vehicle 33 lowers the movable shelf 12, which has been lifted by the lifter 53, to the floor surface.

When the processor 41 determines in step S35 that the identified shelf height is equal to or greater than the predetermined threshold (Yes in step S35), the processor 41 transmits, to automated guided vehicle 33, a control signal for instructing movement to the position indicated by the movable shelf position information acquired in step S32 (step S40). By moving in accordance with the control signal, the automated guided vehicle 33 gets into the position indicated by the movable shelf position information, that is, between the movable shelf base 21 of the movable shelf 12 to be handled and the floor surface.

Further, when the moving of the automated guided vehicle 33 is completed, the processor 41 transmits a control signal for instructing the automated guided vehicle 33 to raise the lifter 53. The automated guided vehicle 33 raises the lifter 53 in response to the control signal. The automated guided vehicle 33 thus lifts the movable shelf 12 by the lifter 53.

The processor 41 transmits a control signal for instructing movement to the second picking station 38A to the automated guided vehicle 33 (step S41). The automated guided vehicle 33 moves to the second picking station 38A in response to the control signal while lifting the movable shelf 12 by the lifter 53. That is, the automated guided vehicle 33 moves the movable shelf 12 to the second picking station 38A.

The processor 41 transmits information on the article 11 to be picked up from the movable shelf 12 to the display device 81A of the second picking station 38A and causes the display device 81A to display the information (step S42). The processor 41 causes the display device 81A to display at least information indicating the position of the shelf 22 on which the article 11 to be removed is stored. The processor 41 may cause the display device 81A to display an image of the appearance of the article 11 to be removed. The staff member in charge of the second picking station 38A unloads the article 11 removed from the movable shelf 12 to a predetermined sorting destination.

When the unloading is completed, the processor 41 transmits, to the automated guided vehicle 33, a control signal for instructing movement to the position indicated by the movable shelf position information acquired in step S32 (step S43), and proceeds to the process of step S44 which is described later. That is, the processor 41 transmits a control signal to the automated guided vehicle 33 so as to move the movable shelf 12 to the original position. The automated guided vehicle 33 moves in response to the control signal to move the movable shelf 12 from which the article 11 has been removed to the original position, that is, the position indicated by the movable shelf position information.

Further, when the moving of the automated guided vehicle 33 is completed, the processor 41 transmits a control signal for instructing the automated guided vehicle 33 to lower the lifter 53. The automated guided vehicle 33 lowers the lifter 53 in response to the control signal. The automated guided vehicle 33 thus lowers the movable shelf 12, which has been lifted by the lifter 53, to the floor surface.

The processor 41 determines whether or not to end the processing (step S44). For example, the processor 41 determines whether or not there is an unhandled article 11. That is, the processor 41 determines whether or not the cargo handling processing of all the articles 11 indicated by the removal instruction has been completed.

When the processor 41 determines not to end the processing (No in step S44), the processor 41 proceeds to the processing of step S31 and outputs a control signal to the automated guided vehicle 33 so as to perform the load handling processing of the next article 11.

When the processor 41 determines to end the process (Yes in step S44), the processor 41 ends the process of FIG. 6.

With the above configuration as well, the control device 32 can move the movable shelf 12 to picking stations designed for handling articles 11 at different heights in accordance with a height at which an article 11 is stored on the movable shelf 12. Thus, high movable shelves 12 can be easily operated in the warehouse, and the space in the vertical direction in the warehouse can be effectively used. As a result, the warehouse management system 1A can efficiently store the articles 11 in the warehouse with a simple configuration.

Third Embodiment

Figure 7:
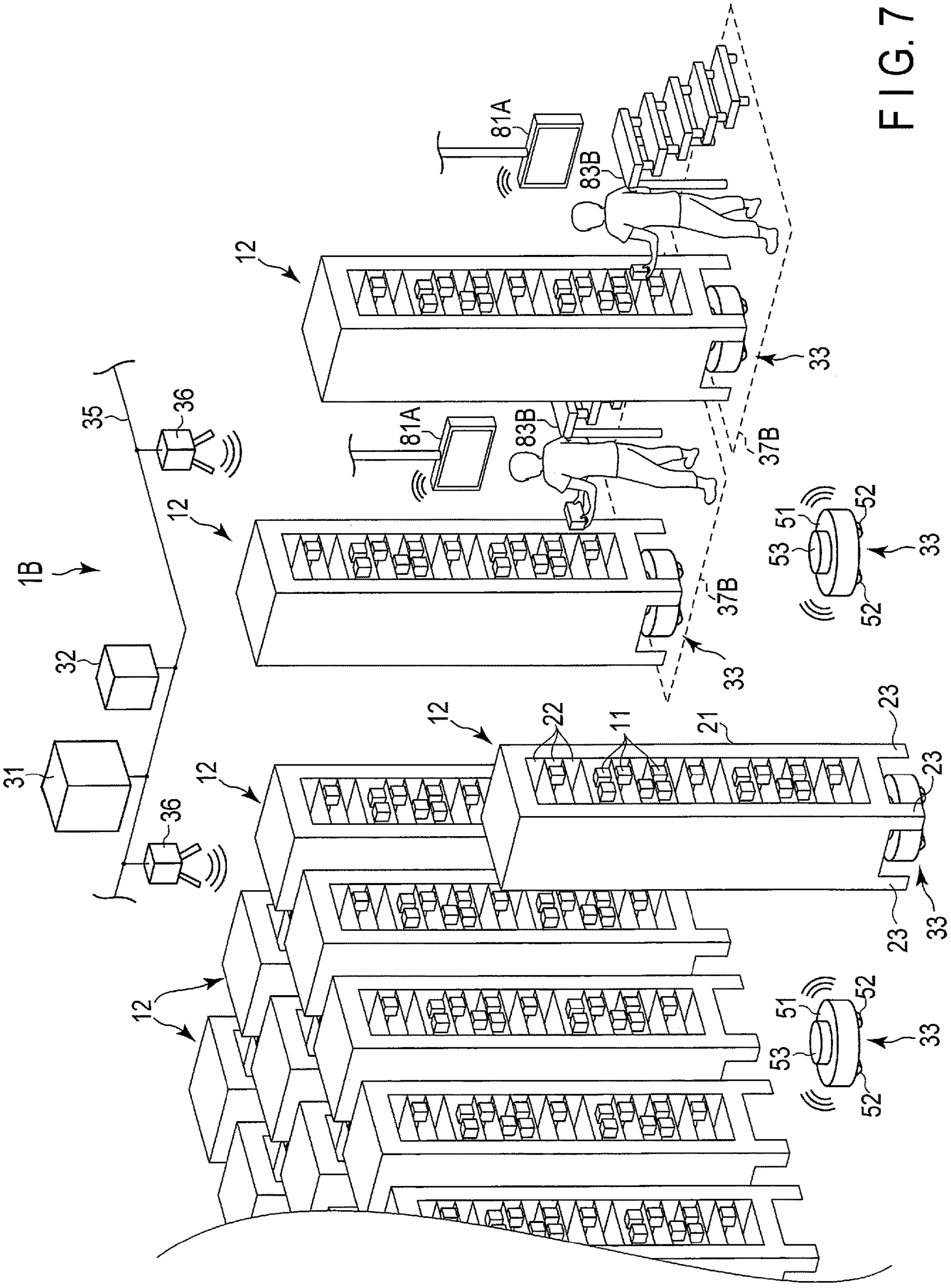
FIG. 7 is an explanatory diagram for explaining a schematic configuration example of a warehouse management system according to a third embodiment.

FIG. 7 is an explanatory diagram for explaining a schematic configuration example of a warehouse management system 1B according to the third embodiment. The same components as those in the first embodiment are denoted by the same reference numerals, and a detailed description thereof is omitted.

The warehouse management system 1B includes a host server 31, a control device 32, an automated guided vehicle 33, a display device 81A, and the like.

Further, in the warehouse management system 1B, a plurality of picking stations 37B in each of which the display device 81A is disposed are provided.

The picking station 37B is a place for removing an article 11 from the movable shelf 12.

In each picking station 37B, a staff member in charge who removes an article 11 from the movable shelf 12 is stationed. In each picking station 37B, a ladder 83B is provided. At the picking station 37B, the staff member can remove an article 11 from the shelf 22 at a high position of the movable shelf 12 by climbing the ladder 83B.

Figure 8:
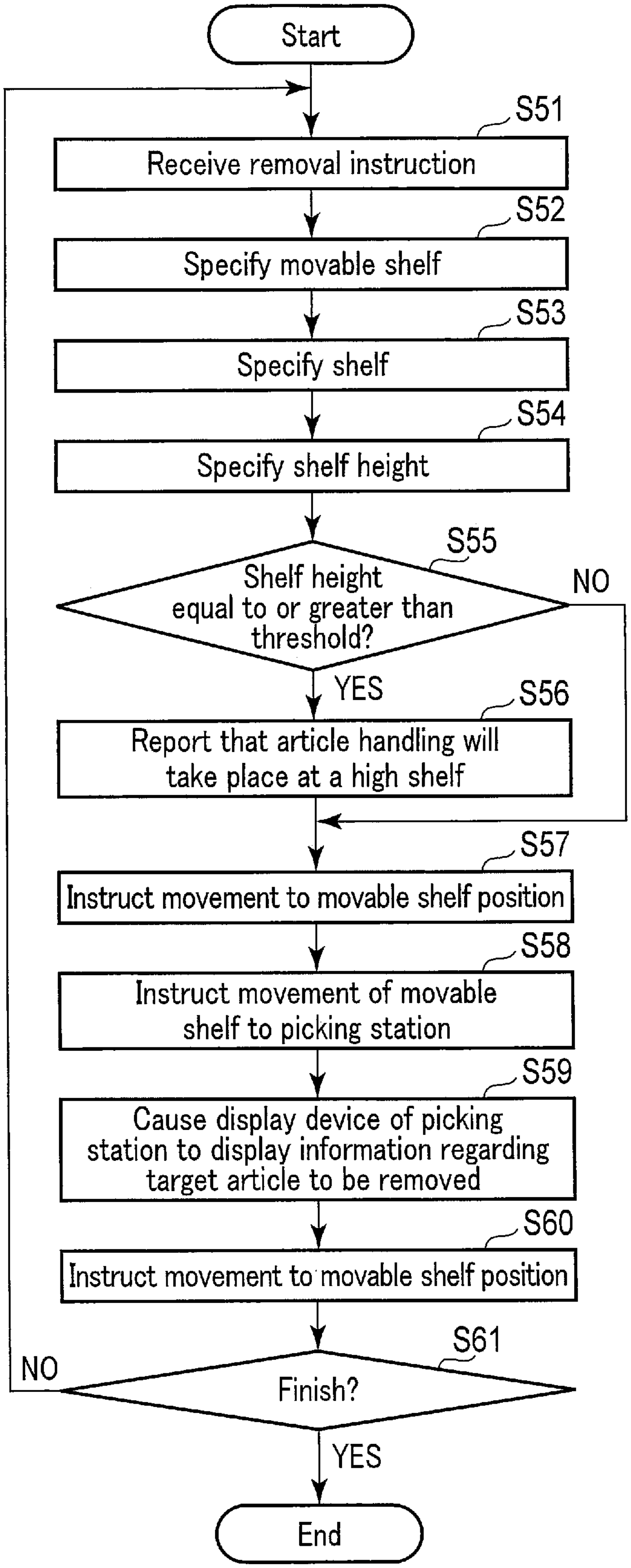
FIG. 8 is an explanatory diagram for explaining an example of an operation of a control device according to the third embodiment.

FIG. 8 is an explanatory diagram for explaining the operation of the control device 32 in the warehouse management system 1B according to the third embodiment.

The processor 41 of the control device 32 acquires a removal instruction indicating a list of articles 11 to be removed from the host server 31 through the communication unit 43 (step S51). The removal instruction may be transmitted from the host server 31 to the control device 32 at an arbitrary timing or periodically.

The removal instruction may be stored in a recording medium or the like that can be connected to the control device 32, and may be given to the control device 32.

The processor 41 specifies the movable shelf 12 on which the article 11 is stored based on the acquired removal instruction (step S52). In other words, the processor 41 acquires the article identification information from the removal instruction, and acquires from the database the movable shelf identification information associated with the acquired article identification information. The processor 41 acquires, from the database, the movable shelf position information associated with the acquired movable shelf identification information.

The processor 41 specifies the shelf 22 on which the article 11 is stored on the specified movable shelf 12 (step S53). That is, the processor 41 acquires, from the database, the shelf identification information associated with the article identification information acquired from the removal instruction.

The processor 41 specifies the height (shelf height) of the specified shelf 22 (step S54). That is, the processor 41 acquires the shelf height information associated with the acquired shelf identification information from the database.

The processor 41 determines whether or not the specified shelf height is equal to or greater than a preset threshold (step S55). The threshold is a value set in accordance with the height of the shelf 22 from which the staff member can remove an article 11 without using the ladder 83B and the height of the shelf 22 from which the staff member can remove an article 11 using the ladder 83B at the picking station 37B.

If it is determined that the specified shelf height is less than the preset threshold (No in step S55), the processor 41 proceeds to the process of step S57, which is described later.

In a case where it is determined that the specified shelf height is equal to or greater than the preset threshold (Yes in step S55), the processor 41 notifies the staff member at the picking station 37B, which is the movement destination of the movable shelf 12, that handling will take place at a high movable shelf 12 (step S56). For example, the processor 41 causes the display device 81A of the picking station 37B to display a necessity of using the ladder 83B in order to remove an article 11 from the movable shelf 12. Thus, in a case where the warehouse management system 1B includes another means for notifying the staff member of information, the staff member may be notified by the other means that the ladder 83B needs to be used to remove an article 11 from the movable shelf 12. For example, the processor 41 may cause a speaker provided in each of the picking stations 37B to output a voice message indicating that the ladder 83B needs to be used to remove an article 11 from the movable shelf 12.

The processor 41 transmits, to the automated guided vehicle 33, a control signal for instructing movement to the position indicated by the movable shelf position information acquired in step S52 (step S57). By moving in accordance with the control signal, the automated guided vehicle 33 gets into the position indicated by the movable shelf position information, that is, between the movable shelf base 21 of the movable shelf 12 to be handled and the floor surface.

Further, when the movement of the automated guided vehicle 33 is completed, the processor 41 transmits a control signal for instructing the automated guided vehicle 33 to raise the lifter 53. The automated guided vehicle 33 raises the lifter 53 in response to the control signal. As a result, the automated guided vehicle 33 lifts the movable shelf 12 by the lifter 53.

The processor 41 transmits a control signal for instructing movement to the picking station 37B to the automated guided vehicle 33 (step S58). The automated guided vehicle 33 moves to the picking station 37B in response to the control signal while lifting the movable shelf 12 by the lifter 53. In other words, the automated guided vehicle 33 moves the movable shelf 12 to the picking station 37B.

The processor 41 transmits information on an article 11 to be picked up from the movable shelf 12 to the display device 81A of the picking station 37B and causes the display device 81A to display the information (step S59). The processor 41 causes the display device 81A to display at least information indicating the position of the shelf 22 on which the article 11 to be removed is stored. The processor 41 may cause the display device 81A to display an image of an appearance of the article 11 to be removed. The staff member at the picking station 37B unloads the article 11 removed from the movable shelf 12 to a predetermined sorting destination.

Upon completion of the unloading, the processor 41 transmits, to the automated guided vehicle 33, a control signal for instructing movement to the position indicated by the movable shelf position information acquired in step S52 (step S60). That is, the processor 41 transmits a control signal to the automated guided vehicle 33 so as to move the movable shelf 12 to the original position. The automated guided vehicle 33 moves in response to the control signal to move the movable shelf 12 from which the article 11 has been removed to the original position, that is, the position indicated by the movable shelf position information.

Further, when the movement of the automated guided vehicle 33 is completed, the processor 41 transmits a control signal for instructing the automated guided vehicle 33 to lower the lifter 53. The automated guided vehicle 33 lowers the lifter 53 in response to the control signal. The automated guided vehicle 33 thus lowers the movable shelf 12, which has been lifted by the lifter 53, to the floor surface.

The processor 41 determines whether or not to end the processing (step S61). For example, the processor 41 determines whether or not there is an unhandled article 11. That is, the processor 41 determines whether or not the cargo handling processing of all the articles 11 indicated by the removal instruction has been completed.

When the processor 41 determines not to end the processing (No in step S61), the processor 41 proceeds to the process in step S51 and outputs a control signal to the automated guided vehicle 33 so as to perform the load handling processing of the next article 11.

When the processor 41 determines to end the process (Yes in step S61), the processor 41 ends the process of FIG. 8.

According to the above-described configuration, before the movable shelf 12 moves to the picking station 37B, the control device 32 can notify a staff member of the picking station 37B that it is necessary to remove the article 11 from the shelf 22 at a high position. Thus, the staff member can prepare the ladder 83B before the movable shelf 12 moves to the picking station 37B. In turn, the high movable shelf 12 can be easily operated in the warehouse, and the space in the vertical direction in the warehouse can be effectively used. As a result, the warehouse management system 1A can efficiently store the articles 11 in the warehouse with a simple configuration.

In the above-described embodiment, it has been described that the "article identification information", the "movable shelf identification information", the "movable shelf position information", the "shelf identification information", and the "shelf height information [mm]" are associated with each other as the database, but the present invention is not limited to this example. The "shelf identification information" may include information corresponding to the shelf height information. For example, the "shelf identification information" may indicate how many shelves are in the shelf 22 in the vertical direction. Thus, if the movable shelf 12 has known dimensions, the height of the shelf 22 can be specified from the shelf identification information.

In the database, instead of the shelf height information, information indicating whether the first picking station 37 is compatible or the second picking station 38 is compatible may be associated. In other words, in the database, it suffices that the shelf identification information and the information indicating the picking station that is compatible may be associated with each other.

In the above embodiment, the first picking station 37 and the second picking station 38 have been described as an example, but the present invention is not limited to this configuration. Further, picking stations provided for various heights may be set in the warehouse management system 1. Each picking station may have any form as long as at least a range of the height of the shelf 22 from which an article 11 can be removed is set.

In the above-described embodiment, the first picking station 37 and the second picking station 38 in each of which the picking robot 34 is stationed, the first picking station 37A and the second picking station 38A in each of which a staff member is stationed, and the like are described; however, the present invention is not limited to this configuration. For example, a picking station at which a staff member is stationed and a picking station at which the picking robot 34 is stationed may be used in combination.

For example, the second picking station 38 in the first embodiment and the first picking station 37A in the second embodiment may be combined. In this case, since the staff member is stationed on the floor surface at the first picking station 37A, the first picking station 37A is configured as a place suitable for removing an article 11 from the shelf 22 at a low position on the movable shelf 12. Since the picking robot 34 is stationed on the base 72 having a predetermined height at the second picking station 38, the second picking station 38 is configured as a place suitable for removing an article 11 from the shelf 22 at a high position on the movable shelf 12.

The processor 41 of the control device 32 switches to which of the first picking station 37A and the second picking station 38 the movable shelf 12 is to be moved based on a preset threshold and the height of the shelf 22 on which the article 11 to be picked up is placed.

For example, the first picking station 37 in the first embodiment and the second picking station 37B in the second embodiment may be combined. Three or more types of picking stations may be combined.

As described above, various types of picking stations can be discretionarily combined for the warehouse management system 1. In addition, the control device 32 can efficiently remove an article 11 from the movable shelf 12 in the warehouse by performing control according to a type of the picking station.

The functions described in the above embodiments may be implemented not only by using hardware but also by using software and causing a computer to read a program in which the functions are described. In addition, each function may be configured by appropriately selecting any one of software and hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the inventions.

What is claimed is:

1. A control device comprising:

a communication unit configured to communicate with a transport vehicle and a host server, the transport vehicle being configured to move a movable shelf storing an article; and a processor, wherein the processor is configured to:

acquire from the host server, by the communication unit, a removal instruction indicating an article to be removed;

acquire, based on the removal instruction, movable shelf identification information for identifying the movable shelf having a plurality of shelves for storing the article and shelf height information on a shelf height at which the article is stored on the movable shelf; and instruct the transport vehicle to move the movable shelf to either (i) a first position suitable for removing the article from a first shelf within a first height range, or (ii) a second position suitable for removing the article from a second shelf within a second height range that is higher than the first height range, wherein the transport vehicle is instructed to move the movable shelf to the first position or the second position based on the acquired movable shelf identification information and the shelf height information, and wherein the first position is a first picking station that includes a first picking robot situated on a first base having a first height, and the second position is a second picking station that includes a second picking robot situated on a second base having a second height higher than the first height.

2. The control device according to claim 1, wherein based on the acquired shelf height information, the processor is configured to perform control in such a manner that the movable shelf is moved by the transport vehicle to the first position if the shelf height is less than a preset threshold, and the movable shelf is moved by the transport vehicle to the second position if the shelf height is equal to or greater than the preset threshold.

3. The control device according to claim 1, further comprising a database in which article identification information of the article and the shelf height information are associated with each other, wherein the processor is configured to switch a movement destination of the movable shelf between the first position and the second position based on the shelf height information associated with the article identification information of the article acquired from the database.

4. The control device according to claim 3, wherein the article identification information of the article, the movable shelf identification information, movable shelf position information indicating a position of the movable shelf, shelf identification information for identifying a shelf on which the article is stored on the movable shelf, and the shelf height information are associated with each another in advance in the database, and the removal instruction indicates the article identification information of the article.

5. The control device according to claim 1, wherein the processor performs control to output a notification to a display device at a movement destination of the movable shelf.

6. A warehouse management system comprising a transport vehicle, a control device, and a database, wherein the transport vehicle includes:

a traveling base;

a moving mechanism that moves the traveling base in response to a control signal from the control device; and a lifter that moves up and down a movable shelf that stores an article, wherein movable shelf identification information for identifying a movable shelf having a plurality of shelves for storing an article and shelf height information of a shelf that stores the article on the movable shelf are associated with each other in advance in the database, and the control device includes:

a communication unit that communicates with the transport vehicle and a host server; and a processor, and the processor is configured to:

acquire from the host server by the communication unit a removal instruction indicating an article to be removed;

acquire the movable shelf identification information and the shelf height information from the database based on the removal instruction; and instruct the transport vehicle to move the movable shelf to either (i) a first position suitable for removing the article from a first shelf within a first height range, or (ii) a second position suitable for removing the article from a second shelf within a second height range that is higher than the first height range, wherein the transport vehicle is instructed to move the movable shelf to the first position or the second position based on the acquired movable shelf identification information and the shelf height information, and wherein the first position is a first picking station that includes a first picking robot situated on a first base having a first height, and the second position is a second picking station that includes a second picking robot situated on a second base having a second height higher than the first height.

* * * * *